(12) United States Patent
Bhargava et al.

(10) Patent No.: US 12,321,246 B2
(45) Date of Patent: Jun. 3, 2025

(54) METHODS AND SYSTEMS FOR A NON-DISRUPTIVE AUTOMATIC UNPLANNED FAILOVER FROM A PRIMARY COPY OF DATA AT A PRIMARY STORAGE SYSTEM TO A MIRROR COPY OF THE DATA AT A CROSS-SITE SECONDARY STORAGE SYSTEM

(71) Applicant: NetApp, Inc., San Jose, CA (US)

(72) Inventors: Rakesh Bhargava, Karnataka (IN); Akhil Kaushik, Karnataka (IN); Divya Kathiresan, Bangalore (IN); Mukul Verma, Rajasthan (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/329,360

(22) Filed: Jun. 5, 2023

(65) Prior Publication Data

US 2023/0305936 A1    Sep. 28, 2023

Related U.S. Application Data

(63) Continuation of application No. 17/219,815, filed on Mar. 31, 2021, now Pat. No. 11,709,743.

(51) Int. Cl.
*G06F 11/00*     (2006.01)
*G06F 11/07*     (2006.01)
*G06F 11/14*     (2006.01)
*G06F 11/20*     (2006.01)
*G06F 11/30*     (2006.01)

(52) U.S. Cl.
CPC ...... *G06F 11/2069* (2013.01); *G06F 11/0772* (2013.01); *G06F 11/1453* (2013.01); *G06F 11/2023* (2013.01); *G06F 11/3034* (2013.01)

(58) Field of Classification Search
CPC ............. G06F 11/2069; G06F 11/0772; G06F 11/1453; G06F 11/2023; G06F 11/3034; G06F 11/0727; G06F 11/2053; G06F 11/2076; G06F 11/2082
See application file for complete search history.

(56) References Cited

U.S. PATENT DOCUMENTS

| | | | |
|---|---|---|---|
| 5,742,792 | A | 4/1998 | Yanai et al. |
| 6,389,551 | B1 | 5/2002 | Yount |
| 6,415,372 | B1 | 7/2002 | Zakai et al. |
| 7,039,827 | B2 | 5/2006 | Meyer et al. |
| 7,500,014 | B1 | 3/2009 | Jacobson et al. |
| 7,631,066 | B1 | 12/2009 | Schatz et al. |

(Continued)

OTHER PUBLICATIONS

Non-Final Office Action mailed Jan. 17, 2023 for U.S. Appl. No. 17/881,381, filed Aug. 4, 2022, 18 pages.

(Continued)

*Primary Examiner* — Joseph D Manoskey
(74) *Attorney, Agent, or Firm* — Jaffery Watson Hamilton & DeSanctis LLP

(57) ABSTRACT

Multi-site distributed storage systems and computer-implemented methods are described for providing an automatic unplanned failover (AUFO) feature to guarantee non-disruptive operations (e.g., operations of business enterprise applications, operations of software application) even in the presence of failures including, but not limited to, network disconnection between multiple data centers and failures of a data center or cluster.

20 Claims, 9 Drawing Sheets

(56) References Cited

U.S. PATENT DOCUMENTS

| | | |
|---|---|---|
| 7,640,451 B2 | 12/2009 | Meyer et al. |
| 7,890,626 B1 | 2/2011 | Gadir |
| 8,498,967 B1 | 7/2013 | Chatterjee et al. |
| 8,645,623 B1 | 2/2014 | O'Shea et al. |
| 8,856,583 B1 | 10/2014 | Msser et al. |
| 8,874,960 B1 | 10/2014 | Khan et al. |
| 9,189,341 B1 | 11/2015 | Natanzon et al. |
| 10,412,066 B1 | 9/2019 | Vemuri |
| 10,496,320 B2 | 12/2019 | Eisler et al. |
| 10,725,691 B1 | 7/2020 | Kaushik et al. |
| 10,761,768 B1 | 9/2020 | Kaushik et al. |
| 11,036,423 B2 | 6/2021 | Kaushik et al. |
| 11,089,105 B1 | 8/2021 | Karumbunathan et al. |
| 11,327,857 B2 | 5/2022 | Bhargava et al. |
| 11,360,867 B1 | 6/2022 | Subramanian et al. |
| 11,409,622 B1 | 8/2022 | Kaushik et al. |
| 11,481,139 B1 | 10/2022 | Vijayan et al. |
| 11,550,679 B2 | 1/2023 | Kaushik et al. |
| 11,709,743 B2 | 7/2023 | Bhargava et al. |
| 2002/0095489 A1* | 7/2002 | Yamagami .......... G06F 11/2094 709/224 |
| 2002/0132613 A1 | 9/2002 | Leung et al. |
| 2004/0153719 A1 | 8/2004 | Achiwa et al. |
| 2005/0229034 A1 | 10/2005 | Fujibayashi |
| 2006/0236048 A1 | 10/2006 | Deguchi et al. |
| 2007/0180307 A1 | 8/2007 | Zohar et al. |
| 2007/0234006 A1 | 10/2007 | Radulescu et al. |
| 2008/0201702 A1 | 8/2008 | Bunn |
| 2009/0043979 A1 | 2/2009 | Jarvis |
| 2009/0089609 A1 | 4/2009 | Baba |
| 2009/0307530 A1 | 12/2009 | Tarta |
| 2010/0064168 A1 | 3/2010 | Smoot et al. |
| 2010/0082962 A1 | 4/2010 | Srinivasan et al. |
| 2010/0161554 A1 | 6/2010 | Datuashvili et al. |
| 2011/0106855 A1 | 5/2011 | Resch et al. |
| 2011/0314148 A1 | 12/2011 | Petersen et al. |
| 2012/0151249 A1 | 6/2012 | Swan et al. |
| 2014/0298136 A1 | 10/2014 | Resch et al. |
| 2015/0006949 A1 | 1/2015 | Bittles et al. |
| 2015/0058838 A1 | 2/2015 | Tsirkin |
| 2016/0255016 A1* | 9/2016 | Miller .................. H04L 47/805 709/217 |
| 2016/0366226 A1 | 12/2016 | Friedman et al. |
| 2017/0093983 A1 | 3/2017 | Everhart et al. |
| 2017/0220433 A1* | 8/2017 | Dimnaku .............. G06F 11/008 |
| 2018/0260125 A1* | 9/2018 | Botes .................. G06F 11/2094 |
| 2018/0352032 A1 | 12/2018 | Liu et al. |
| 2019/0004908 A1 | 1/2019 | Gopinath et al. |
| 2019/0034286 A1 | 1/2019 | Brown et al. |
| 2019/0229978 A1 | 7/2019 | Rajvaidya et al. |
| 2019/0347352 A1 | 11/2019 | Gochkov et al. |
| 2019/0394266 A1 | 12/2019 | Fukuyama et al. |
| 2020/0034258 A1 | 1/2020 | Avraham et al. |
| 2020/0050495 A1 | 2/2020 | Voutilainen et al. |
| 2020/0050587 A1 | 2/2020 | Kaushik et al. |
| 2020/0125460 A1 | 4/2020 | Selvaraj et al. |
| 2020/0133520 A1 | 4/2020 | Patnaik et al. |
| 2020/0273984 A1 | 8/2020 | Nakano et al. |
| 2020/0278984 A1 | 9/2020 | Kaushik et al. |
| 2020/0319982 A1 | 10/2020 | Rusev et al. |
| 2021/0303165 A1 | 9/2021 | Kaushik et al. |
| 2021/0374157 A1 | 12/2021 | Reddy et al. |
| 2022/0019350 A1 | 1/2022 | Karr |
| 2022/0121533 A1 | 4/2022 | Kumar et al. |
| 2022/0318104 A1 | 10/2022 | Bhargava et al. |
| 2022/0374321 A1 | 11/2022 | Kaushik et al. |

OTHER PUBLICATIONS

Notice of Allowance mailed Dec. 13, 2022 for U.S. Appl. No. 17/219,815, filed Mar. 31, 2021.

Notice of Allowance mailed Nov. 18, 2022 for U.S. Appl. No. 17/219,812, filed Mar. 31, 2021, 12 pages.

Notice of Allowance mailed Oct. 31, 2022 for U.S. Appl. No. 17/219,812, filed Mar. 31, 2021, 9 pages.

Notice of Allowance mailed on Mar. 3, 2023 for U.S. Appl. No. 17/219,815, filed Mar. 31, 2021, 5 pages.

Pan L., "Paxos at Its Heart is Very Simple", Distributed System, 2018, Retrieved From : URL: https://blog.the-pans.com/paxos-explained/, pp. 1-12.

U.S. Non-Final Office action dated Dec. 21, 2021 in U.S. Appl. No. 17/238,829, filed Apr. 23, 2021, 20 pages.

U.S. Notice of Allowance dated Apr. 6, 2022 in U.S. Appl. No. 17/238,829, filed Apr. 23, 2021, 9 pages.

U.S. Notice of Allowance mailed Jun. 24, 2022 in U.S. Appl. No. 17/219,816, filed Mar. 31, 2021, 8 pages.

U.S. Notice of Allowance mailed May 6, 2022 in U.S. Appl. No. 17/219,746, filed Mar. 31, 2021, 18 pages.

U.S. Notice of Allowance mailed Oct. 26, 2022 in U.S. Appl. No. 17/219,812, filed Mar. 31, 2021, 9 pages.

* cited by examiner

METHODS AND SYSTEMS FOR A NON-DISRUPTIVE AUTOMATIC UNPLANNED FAILOVER FROM A PRIMARY COPY OF DATA AT A PRIMARY STORAGE SYSTEM TO A MIRROR COPY OF THE DATA AT A CROSS-SITE SECONDARY STORAGE SYSTEM

RELATED APPLICATIONS

This application is a continuation of U.S. patent application Ser. No. 17/219,815, filed Mar. 31, 2021, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, NetApp, Inc.

FIELD

Various embodiments of the present disclosure generally relate to multi-site distributed data storage systems. In particular, some embodiments relate to improving system operation and user experience based on providing a non-disruptive automatic unplanned failover from a primary storage system to a secondary mirrored storage system.

DESCRIPTION OF THE RELATED ART

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. Business enterprises rely on multiple clusters for storing and retrieving data. Each cluster may be a separate data center with the clusters able to communicate over an unreliable network. The network can be prone to failures leading to connectivity issues such as transient or persistent connectivity issues that disrupt operations of a business enterprise. Failures handled manually with user intervention require additional time to restore operations of the business enterprise.

SUMMARY

Systems and methods are described for a non-disruptive automatic unplanned failover (AUFO) from a primary copy of data at a primary storage system to a mirror copy of the data at a cross-site secondary storage system. According to an example, an automatic unplanned failover feature of a multi-site distributed storage system provides an order of operations such that a primary copy of a first data center continues to serve I/O operations until a mirror copy of a second data center is ready. This AUFO feature improves functionality and efficiency of the multi-site distributed storage system by providing non-disruptiveness during unplanned failover—in presence of various failures.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
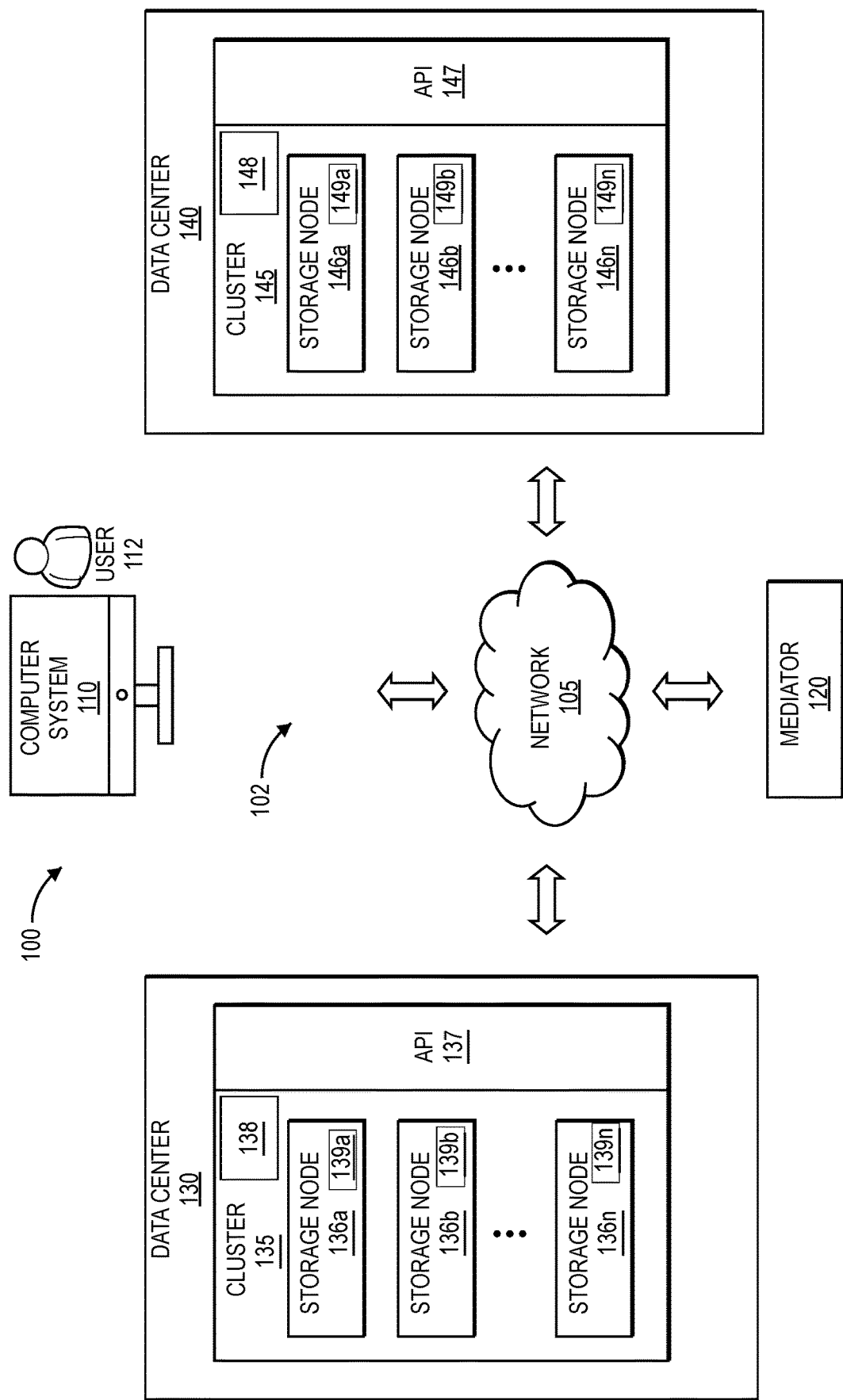
FIG. 1 is a block diagram illustrating an environment in which various embodiments may be implemented.

Multi-site distributed storage systems and computer-implemented methods are described for providing an automatic unplanned failover (AUFO) feature to guarantee non-disruptive operations (e.g., operations of business enterprise applications, operations of software application) even in the presence of failures including, but not limited to, network disconnection between multiple data centers and failures of a data center or cluster.

A synchronous replication from a primary copy of data of a consistency group (CG) at a primary storage system at a first site (primary storage site) to a secondary copy of data at a secondary storage system of a second site (secondary storage site) can fail due to many reasons including inter cluster connectivity issues. These issues can occur if the secondary storage site can not differentiate between the primary storage site being down, in isolation, or just a network partition. A trigger for the automated failover is generated from a data path and if the data path is lost, can lead to disruption. For example, if the primary storage site is not operational or is isolated (e.g., network partition leading to both inter cluster connectivity and connectivity to a Mediator are lost), then a continuity relationship (or relationship) between the primary and secondary storage sites guarantees non-disruptiveness due to allowing I/O operations to be handled with the secondary mirror copy of data. However, there are timing windows between the primary storage site being non-operational and the secondary mirror copy being ready to serve I/O operations where a second failure can lead to disruption. For example, a controller failure (second failure) in a cluster hosting the secondary mirror copy of the data can lead to disruption. However, the automatic unplanned failover feature of the present design guarantees non-disruptive operations (e.g., operations of business enterprise applications, operations of software application) even in the presence of these multiple failures for this example. Upon a disaster of the consistency group of the primary storage site, an automatic unplanned failover is triggered and an application can seamlessly access the secondary mirror copy of the data and continue services for a host. In one example, the automatic unplanned failover is triggered using a Mediator or mediator agent but without manual intervention.

An order of operations performed by an automatic failover includes a timing window where both a primary copy of data at a first storage site and a mirror copy of the data at a secondary storage site are designated with a role of a master and therefore are capable of serving input/output (I/O) operations (e.g., I/O commands) to an application independently. However, if multiple storage sites are simultaneous allowed to serve I/O operations, then this causes a split-brain situation and results in data consistency issues.

The automatic unplanned failover feature of a multi-site distributed storage system provides an order of operations such that a primary copy of data at a first storage site continues to serve I/O operations until a mirror copy of the data at a secondary storage site is ready. This AUFO feature improves functionality and efficiency of the multi-site distributed storage system by providing non-disruptiveness during unplanned failover—even in presence of various failures. In one example, after obtaining a positive consensus that is cached, a second cluster reboots and after the second cluster is operational, connectivity to the mediator is lost (either transient or persistent). This caching of the consensus provides non-disruptiveness in a double failure scenario where the second cluster performs a reboot and meanwhile the connectivity to the mediator fails in a transient or permanent manner. Operations of business enterprises and software applications that utilize a multi-site distributed storage system are improved due to being able to continuously access that distributed storage system even in the presence of multiple failures within the distributed storage system or failures between components of the distributed storage system.

A current approach that has more disruption and down time due to one or more failures within a storage system or between storage systems will be less efficient in serving I/O operations due to the disruption of operations including serving I/O operations. The current approach will not be able to determine a consensus for serving I/O operations if a connection from a data center to a mediator is lost or disrupted. In this case, a primary storage and secondary mirror storage may both attempt to obtain consensus and both attempt to serve I/O operations simultaneously, which will reduce the distributed storage system efficiency and congest network connections to clients with redundant responses to I/O operations.

Other current approaches provide local high availability protection with non-disruptive operations in the event of a single controller failure. In one embodiment, cross-site high availability is a valuable addition to cross-site zero recover point objective (RPO) that provides non-disruptive operations even if an entire local data center becomes non-functional based on a seamless failing over of storage access to a mirror copy hosted in a remote data center. This type of failover is also known as zero RTO, near zero RTO, or automatic failover. A cross-site high availability storage when deployed with host clustering enables workloads to be in both data centers.

An unplanned failover is desired for a distributed high availability storage system. Given that more workloads are moving to a cloud environment and many customers deploy hybrid cloud, applications will also demand these same features in the cloud including cross-site high availability, unplanned failover, etc.

As such, embodiments described herein seek to improve the technological processes of multi-site distributed data storage systems that have a primary copy of data stored in a consistency group of a primary storage site and a secondary mirror copy of the data that is stored in a consistency group of a secondary storage site. Various embodiments of the present technology provide for a wide range of technical effects, advantages, and/or improvements to multi-site distributed storage systems and components. For example, various embodiments may include one or more of the following technical effects, advantages, and/or improvements: (i) detection of a failure for a primary storage site with an external mediator based on out of sync processing of a secondary storage site (ii) triggering an automatic unplanned failover based on the detection of the failure to guarantee non-disruptiveness during the automatic unplanned failover—in presence of various failures; (iii) avoidance of split-brain and preference for the primary storage site to continue as a master in case the primary storage site is operational; and (iv) restorability of the automatic unplanned failover based on persistently storing an indication that the mediator triggered the automatic unplanned failover, which enables the automatic unplanned failover to restart even in present of multiple failures for the primary and second storage sites.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes a configuration database 138, multiple storage nodes 136a-n each having a respective mediator agent 139a-n, and an Application Programming Interface (API) 137. In the context of the present example, the multiple storage nodes 136a-n are organized as a cluster and provide a distributed storage architecture to service storage requests issued by one or more clients (not shown) of the cluster. The configuration database may store configuration information for a cluster. A configuration database provides cluster wide storage for storage nodes within a cluster. The data served by the storage nodes 136a-n may be distributed across multiple storage units embodied as persistent storage devices, including but not limited to HDDs, SSDs, flash memory systems, or other storage devices. In a similar manner, cluster 145 includes a configuration database 148, multiple storage nodes 146a-n each having a respective mediator agent 149a-n, and an Application Programming Interface (API) 147. In the context of the present example, the multiple storage nodes 146a-n are organized as a cluster and provide a distributed storage architecture to service storage requests issued by one or more clients of the cluster.

The API 137 may provide an interface through which the cluster 135 is configured and/or queried by external actors (e.g., computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
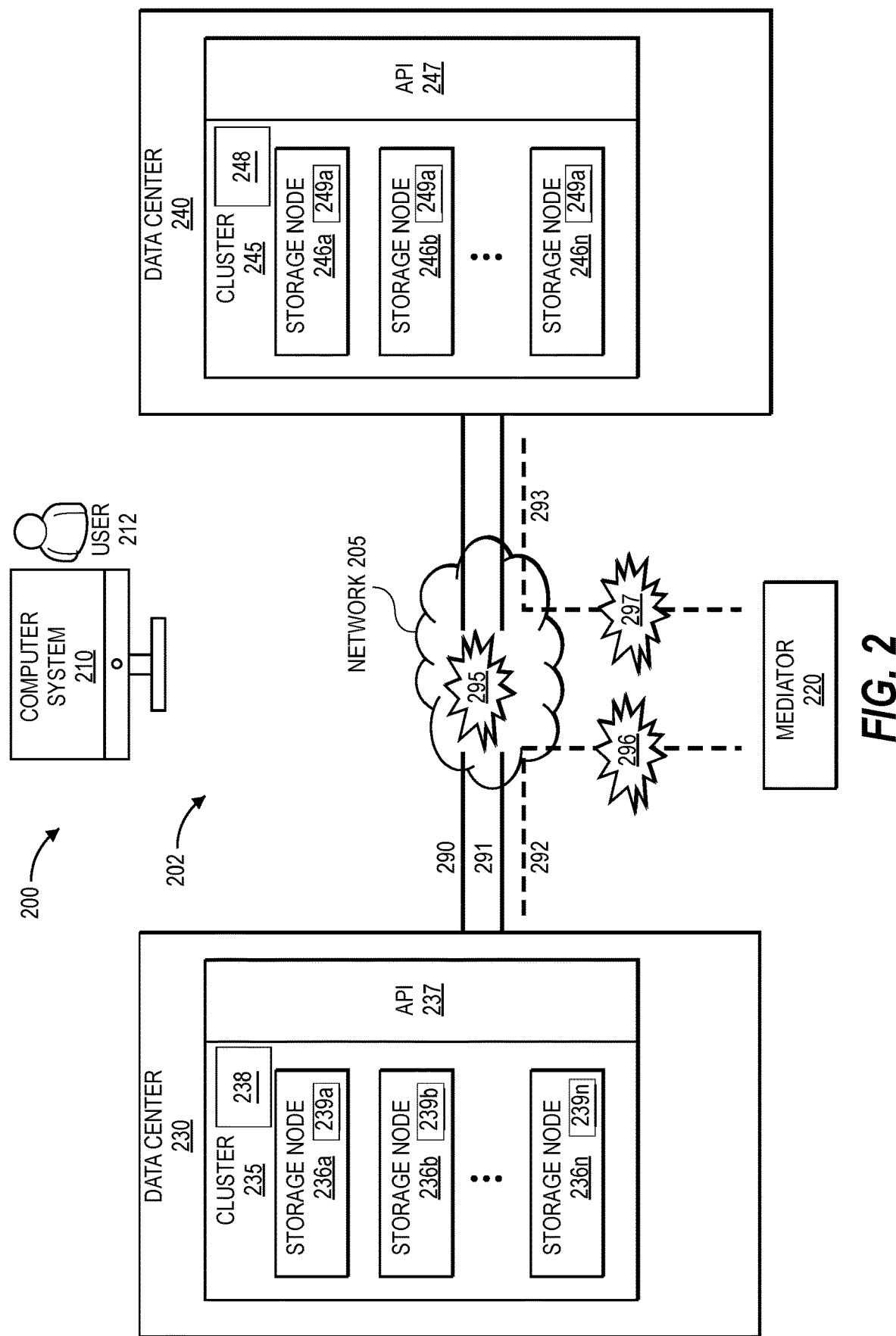
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes a configuration database 238, at least two storage nodes 236a-b, optionally includes additional storage nodes (e.g., 236n) and an Application Programming Interface (API) 237. The storage nodes 236a-n each include a respective mediator agent 239a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes a configuration database 248, at least two storage nodes 246a-b, optionally includes additional storage nodes (e.g., 246n) and includes an Application Programming Interface (API) 247. The storage nodes 246a-n each include a respective mediator agent 249a-n. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

A synchronous replication from a primary copy of data at a primary storage site (e.g., cluster 235) to a secondary copy of data at a secondary storage site (e.g., cluster 245) can fail due to inter cluster or cluster to mediator connectivity issues (e.g., failures 295, 296, 297). These issues can occur if the secondary storage site can not differentiate between the primary storage site being non-operation (or isolation), or just a network partition. A trigger for the automated failover is generated from a data path and if the data path is lost, this can lead to disruption. A continuity relationship between the primary and secondary storage sites guarantees non-disruptiveness due to allowing I/O operations to be handled with the secondary mirror copy of data. However, there are timing windows between the primary storage site being non-operational and the secondary mirror copy being ready to serve I/O operations where a second failure can lead to disruption. For example, a controller failure in a cluster hosting the secondary mirror copy of the data. The automatic unplanned failover feature of the present design guarantees non-disruptive operations (e.g., operations of business enterprise applications, operations of software application) even in the presence of these multiple failures.

In one example, each cluster can have up to 5 consistency groups with each consistency group having up to 12 volumes. The system 202 provides an automatic unplanned failover feature at a consistency group granularity. The unplanned failover feature allows switching storage access from a primary copy of the data center 230 to a mirror copy of the data center 240 or vice versa.

Figure 3:
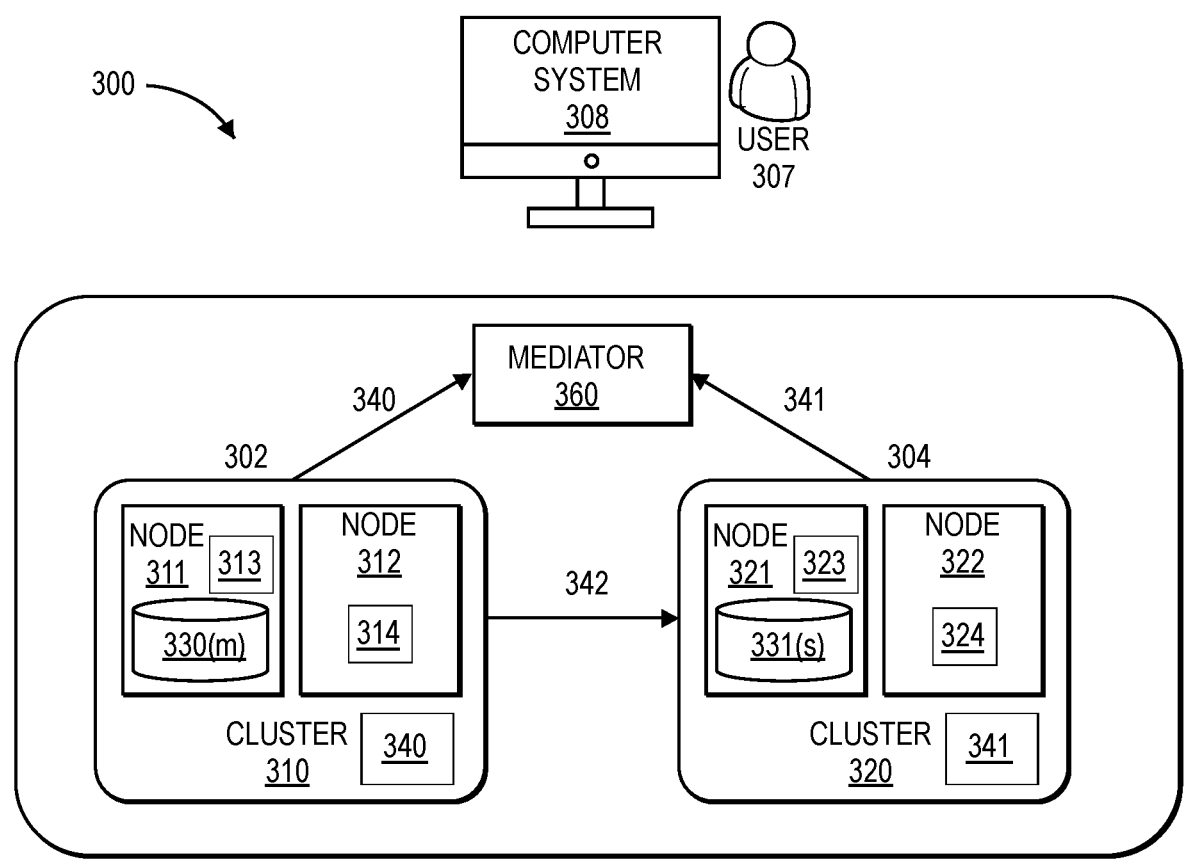
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 307) of the multi-site distributed storage system 300 or a managed service provider responsible for multiple distributed storage systems of the same or multiple customers may monitor various operations and network conditions of the distributed storage system or multiple distributed storage systems via a browser-based interface presented on computer system 308. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of multiple failures including, but not limited to, network disconnection between the data centers 302 and 304 and the mediator 360.

The multi-site distributed storage system 300 provides correctness of data, availability, and redundancy of data. In one example, the node 311 is designated as a master and the node 321 is designated as a slave. The master is given preference to serve I/O operations to requesting clients and this allows the master to obtain a consensus in a case of a race between the clusters 310 and 320. The mediator 360 enables an automated unplanned failover (AUFO) in the event of a failure. The data copy 330 (master), data copy 331 (slave), and the mediator 360 form a three way quorum. If two of the three entities reach an agreement for whether the master or slave should serve I/O operations to requesting clients, then this forms a strong consensus.

The master and slave roles for the clusters 310 and 320 help to avoid a split-brain situation with both of the clusters simultaneously attempting to serve I/O operations. For example, the master may become unresponsive while a mediator detects this unresponsiveness to be a master non-operational situation. The master being non-operational can potentially cause a race between master and slave copy both simultaneously attempting to obtain a consensus. However, only one of the master and the slave should win the race and then be allowed to handle I/O operations. If this race is not prevented, it can result in the split-brain situation.

There are scenarios where both master and slave copies can claim to be a master copy. In one example, a slave cannot serve I/O until an AUFO happens. A master doesn't serve I/O operations until the master obtains a consensus.

The mediator agents (e.g., 313, 314, 323, 324) are configured on each node within a cluster. The system 300 can perform appropriate actions based on event processing of the mediator agents. The mediator agent(s) processes events that are generated at a lower level (e.g., volume level, node level) and generates an output for a consistency group level. In one example, the nodes 311, 312, 321, and 322 for a consistency group. The mediator agent provides services for various events (e.g., simultaneous events, conflicting events) generated in a business continuity relationship between each cluster.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (slave) are proxied to node 311.

Example Storage Node

Figure 4:
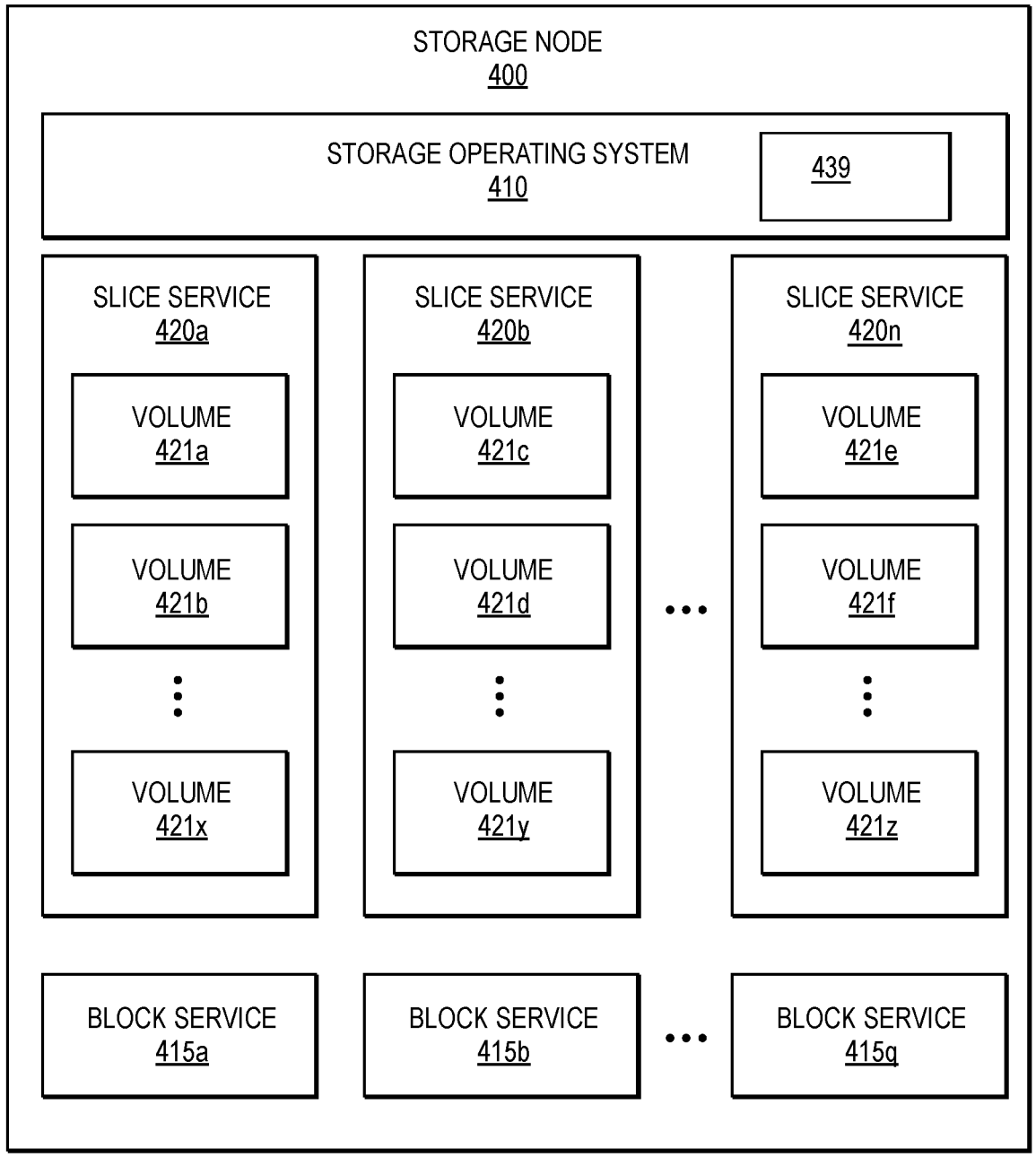
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136a-n, 146a-n, 236a-n, 246a-n, 311, 312, 321, 322) described herein. In the context of the present example, a storage node 400 may be a network storage controller or controller that provides access to data stored on one or more volumes. The storage node 400 includes a storage operating system 410, a mediator agent 439, one or more slice services 420a-n, and one or more block services 415a-q. The mediator agent 439 can be separate or integrated with the storage operating system 410. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421a-x, volumes 421c-y, and volumes 421e-z). Client systems (not shown) associated with an enterprise may store data to one or more volumes, retrieve data from one or more volumes, and/or modify data stored on one or more volumes.

The slice services 420a-n and/or the client system may break data into data blocks. Block services 415a-q and slice services 420a-n may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420a-n may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415a-q and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Figure 5:
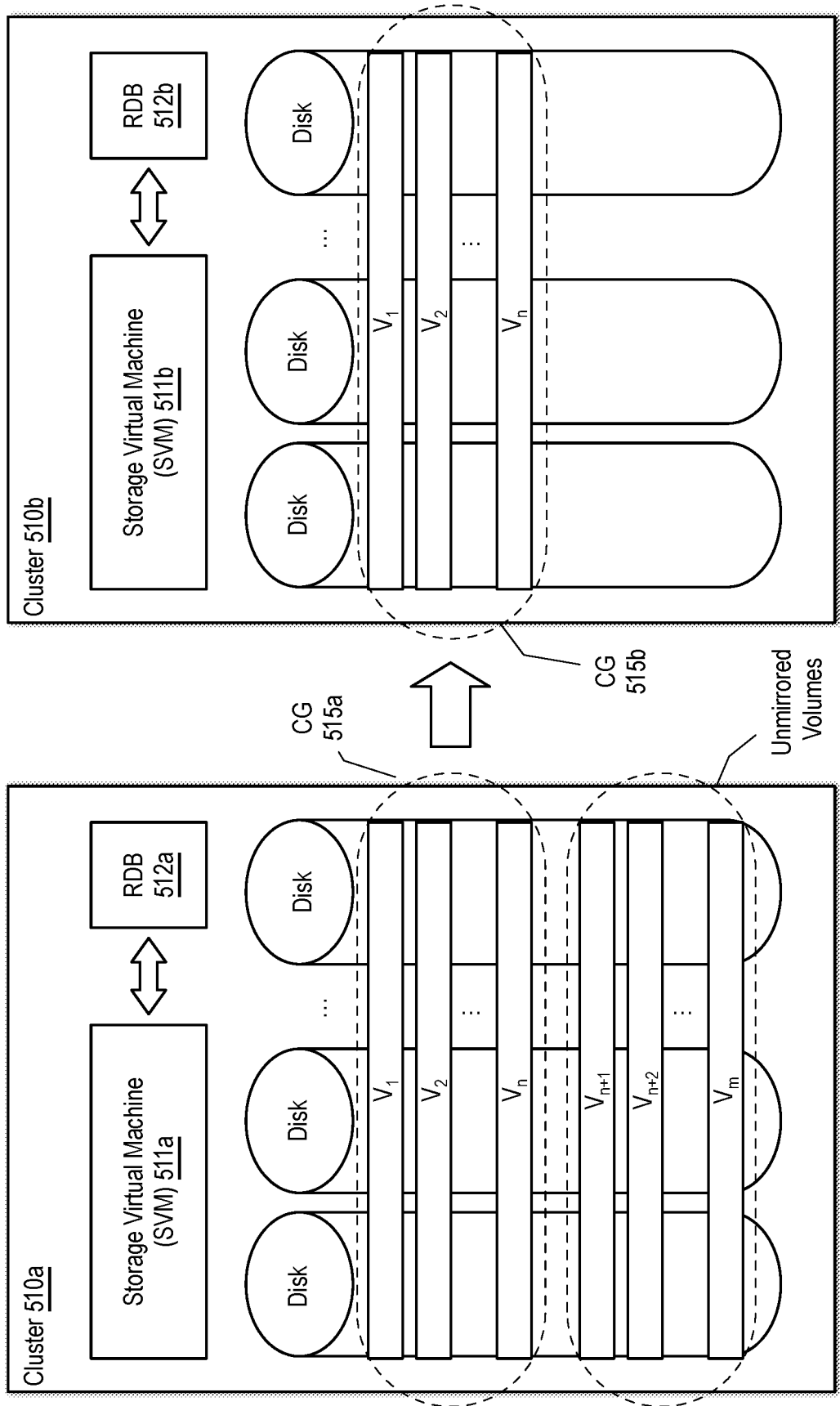
FIG. 5 is a block diagram illustrating the concept of a consistency group (CG) in accordance with an embodiment.

FIG. 5 is a block diagram illustrating the concept of a consistency group (CG) in accordance with an embodiment. In the context of the present example, a stretch cluster including two clusters (e.g., cluster 510a and 510b) is shown. The clusters may be part of a cross-site high-availability (HA) solution that supports zero recovery point objective (RPO) and zero recovery time objective (RTO) by, among other things, providing a mirror copy of a dataset at a remote location, which is typically in a different fault domain than the location at which the dataset is hosted. For example, cluster 510a may be operable within a first site (e.g., a local data center) and cluster 510b may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 515a or CG 515b). A CG is a collection of storage objects or data containers (e.g., volumes) within a cluster that are managed by a Storage Virtual Machine (e.g., SVM 511a or SVM 511b) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time. The level of granularity of operations supported by a CG is useful for various types of applications. As a non-limiting example, consider an application, such as a database application, that makes use of multiple volumes, including maintaining logs on one volume and the database on another volume.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 515a may be referred to as a local CG from the perspective of cluster 510a and as a remote CG from the perspective of cluster 510b. Similarly, CG 515a may be referred to as a remote CG from the perspective of cluster 510b and as a local CG from the perspective of cluster 510b. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 512a and 512b), which may store configuration information for their respective clusters. A configuration database provides cluster wide storage for storage nodes within a cluster. The configuration information may include relationship information (e.g., relationship information of a continuity relationship) specifying the status, direction of data replication, relationships, and/or roles of individual CGs, a set of CGs, members of the CGs, and/or the mediator. A pair of CGs may be said to be "peered" when one is protecting the other. For example, a CG (e.g., CG 115b) to which data is configured to be synchronously replicated may be referred to as being in the role of a destination CG, whereas the CG (e.g., CG 515a) being protected by the destination CG may be referred to as the source CG. Various events (e.g., transient or persistent network connectivity issues, availability/unavailability of the mediator, site failure, and the like) impacting the stretch cluster may result in the relationship information being updated at the cluster and/or the CG level to reflect changed status, relationships, and/or roles.

While in the context of various embodiments described herein, a volume of a consistency group may be described as performing certain actions (e.g., taking other members of a consistency group out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of CGs associated with different clusters (e.g., from a primary or master cluster to a secondary or slave cluster), data replication may also be performed asynchronously and/or within the same cluster. Similarly, a single remote CG may protect multiple local CGs and/or multiple remote CGs may protect a single local CG. In addition, those skilled in the art will appreciate a cross-site high-availability (HA) solution may include more than two clusters, in which a mirrored copy of a dataset of a primary (master) cluster is stored on more than one secondary (slave) cluster.

Figure 6A:
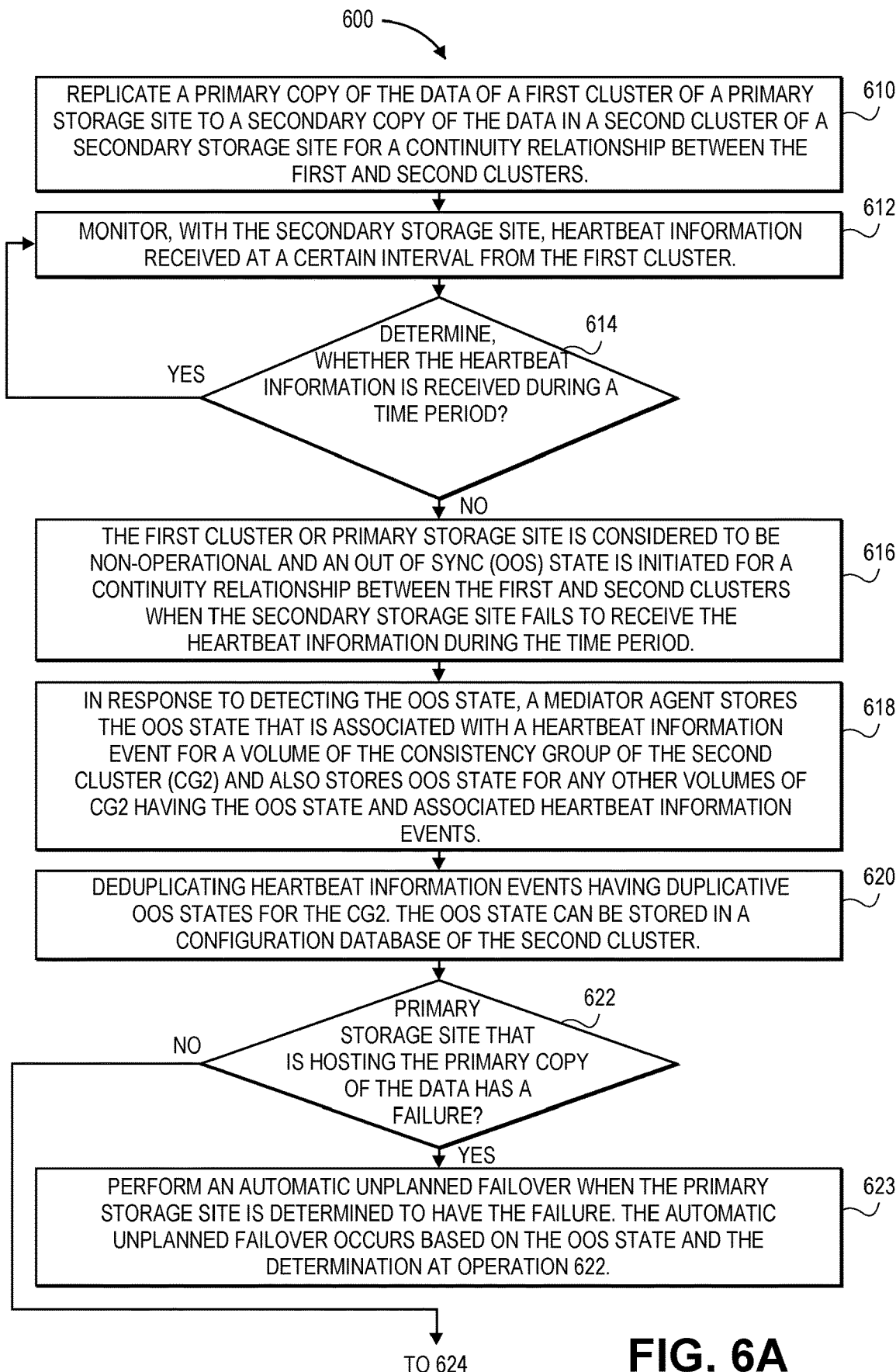
FIGS. 6A and 6B are flow diagrams illustrating a computer-implemented method 600 of operations for an automatic unplanned failover feature that provides non-disruptiveness in presence of failures in accordance with an embodiment of the present disclosure.
Figure 6B:
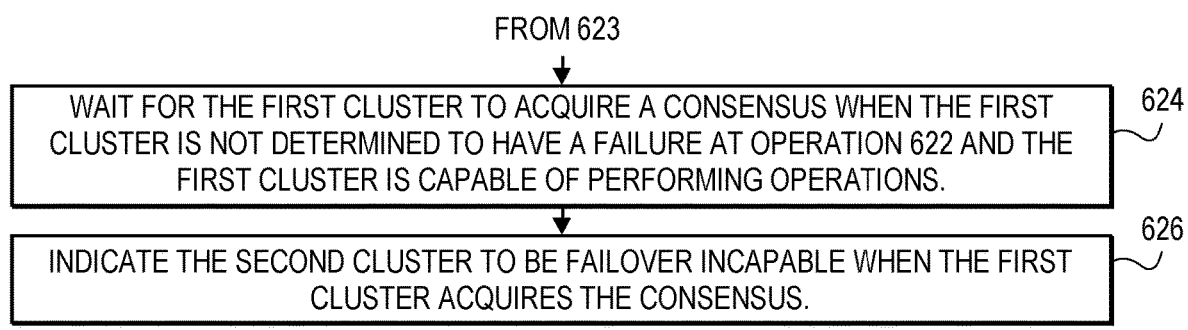

FIGS. 6A and 6B are a flow diagram illustrating a computer-implemented method 600 of operations for an automatic unplanned failover (AUFO) feature that provides non-disruptiveness in presence of failures in accordance with an embodiment of the present disclosure. As noted above, this AUFO feature of the present design provides an order of operations such that a primary copy of data at a primary storage site continues to serve I/O operations until a mirror copy of the data at secondary storage site is ready. This AUFO feature provides non-disruptiveness during unplanned failover—in presence of various failures. The AUFO feature also avoids a split-brain situation by the way of a strong consensus (e.g., strong consensus in a PAXOS instance) based on having the primary copy of the data at the primary storage site, a mirror copy of the data at the secondary storage site, and an external mediator at a third site.

Although the operations in the computer-implemented method 600 are shown in a particular order, the order of the actions can be modified. Thus, the illustrated embodiments can be performed in a different order, and some operations may be performed in parallel. Some of the operations listed in FIG. 6 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 600 may be executed by a storage controller, a storage virtual machine (e.g., SVM 511a, SVM 511b), a mediator (e.g., mediator 120, mediator 220, mediator 360), a mediator agent (e.g., mediator agent 139a-139n, mediator agent 149a-149n, mediator agent 239a-239n, mediator agent 249a-249n, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

In one embodiment, a multi-site distributed storage system includes the primary storage site having a first cluster with a primary copy of data in a consistency group (CG1). The consistency group of the first cluster is assigned a master role. A second cluster of the secondary storage site has a secondary mirror copy of the data in a consistency group. The consistency group of the second cluster (CG2) is assigned a slave role.

At operation 610, the computer-implemented method includes replicating, with a communication channel, the primary copy of the data of the first cluster of the primary storage site to the secondary copy of the data in the second cluster of the secondary storage site for a continuity relationship (or relationship) between the first and second clusters. At operation 612, the computer-implemented method includes monitoring, with the secondary storage site, heartbeat information received at a certain interval from the first cluster. In one example, the heartbeat information is transferred from the first cluster to the second cluster with the communication channel. A heartbeat is a periodic signal generated by hardware or software to indicate normal operation or to synchronize other parts of a computer system. Usually heartbeat information is sent between machines at a regular interval in the order of seconds.

At operation 614, the computer-implemented method includes determining, with the secondary storage site, whether the heartbeat information is received at the certain interval during a time period. The method returns to operation 612 to continue monitoring heartbeat information if the heartbeat information is received during the time period at operation 614.

If heartbeat information is not received during the time period, then the first cluster or primary storage site is considered to be non-operational (or potentially non-operational) and the computer-implemented method includes initiating an out of sync (OOS) state for a continuity relationship between the first and second clusters when the secondary storage site fails to receive the heartbeat information from the first cluster during the time period (e.g., time period of 2 intervals, 3 intervals, 4 intervals, etc.) at operation 616. The OOS state may be based on OOS events of one or more volumes of CG2.

At operation 618, in response to detecting the OOS state, a mediator agent stores the OOS state that is associated with a heartbeat information event for a volume of the consistency group of the second cluster and also stores OOS state for any other volumes of the consistency group having the OOS state and associated heartbeat information events. An external mediator is provisioned in a third site and configured on the first and second storage clusters as a mediator agent to act as an arbitrator towards handling of split brain scenarios and other failure cases including site failures.

At operation 620, the computer-implemented method includes deduplicating, with a mediator agent, heartbeat information events having duplicative OOS states for the CG2. The OOS state can be stored in a configuration database (e.g., 512a, 512b) of the second cluster.

The OOS state triggers or causes a determination of whether the primary storage site that is hosting the primary copy of the data has a failure at operation 622. In one example, a mediator agent of the second cluster communicates with an external third party mediator to perform this determination.

At operation 623, the computer-implemented method includes performing an automatic unplanned failover when the primary storage site is determined to have the failure. The automatic unplanned failover occurs based on the OOS state and the determination at operation 622. The automatic unplanned failover is performed when the first cluster or the primary storage site is determined to have a failure and detection of the OOS state to avoid a split-brain situation.

At operation 624 of FIG. 6B, the computer-implemented method includes waiting for the first cluster to acquire a consensus when the primary storage site is not determined to have a failure at operation 622 and the primary storage site is capable of performing operations. At operation 626, the computer-implemented method includes indicating the second cluster to be failover incapable when the first cluster acquires the consensus. A mediator can indicate the second cluster to be failover incapable when the mediator detects the primary storage site to be operational or when an inter cluster communication is received to indicate that the primary storage site is operational. The failover incapable status is indicated with a persistent bit in a volume and this implies that the secondary copy of data is out of sync with the primary copy of the data in the first cluster. Thus, the second cluster with the secondary copy of data is not able to participate in AUFO.

Recording the role change for the AUFO as a persistent state in the CG relationship is important for AUFO restartability. For example, the AUFO process may fail due to a controller failure of a cluster or site. This persistent state helps to restart the AUFO process, which is designed to be idempotent, that is repeatable with a successful outcome for operations that result in volume state changes.

A failure prior to recording the role change for the AUFO as a persistent state is handled by restarting an OOS state for the second cluster whenever a secondary copy of data gets mounted (e.g., a group of files in a file system are accessible to a user or group of users) and also resending the OOS state to the mediator at finite intervals.

A failure after recording the role change for the AUFO as a persistent state is handled by restarting the AUFO process, which is designed to be idempotent. Thus, repeating the AUFO process or re-running the AUFO process will not generate a different outcome. Once the AUFO process completes successfully, this resets an AUFO bit from the CG relationship configuration.

The automatic unplanned failover is designed to complete operations based on persistently storing an indication of detection of a failure in the second cluster, which enables the automatic unplanned failover to restart even when multiple failures occur in the multi-site distributed storage system.

Figure 7:
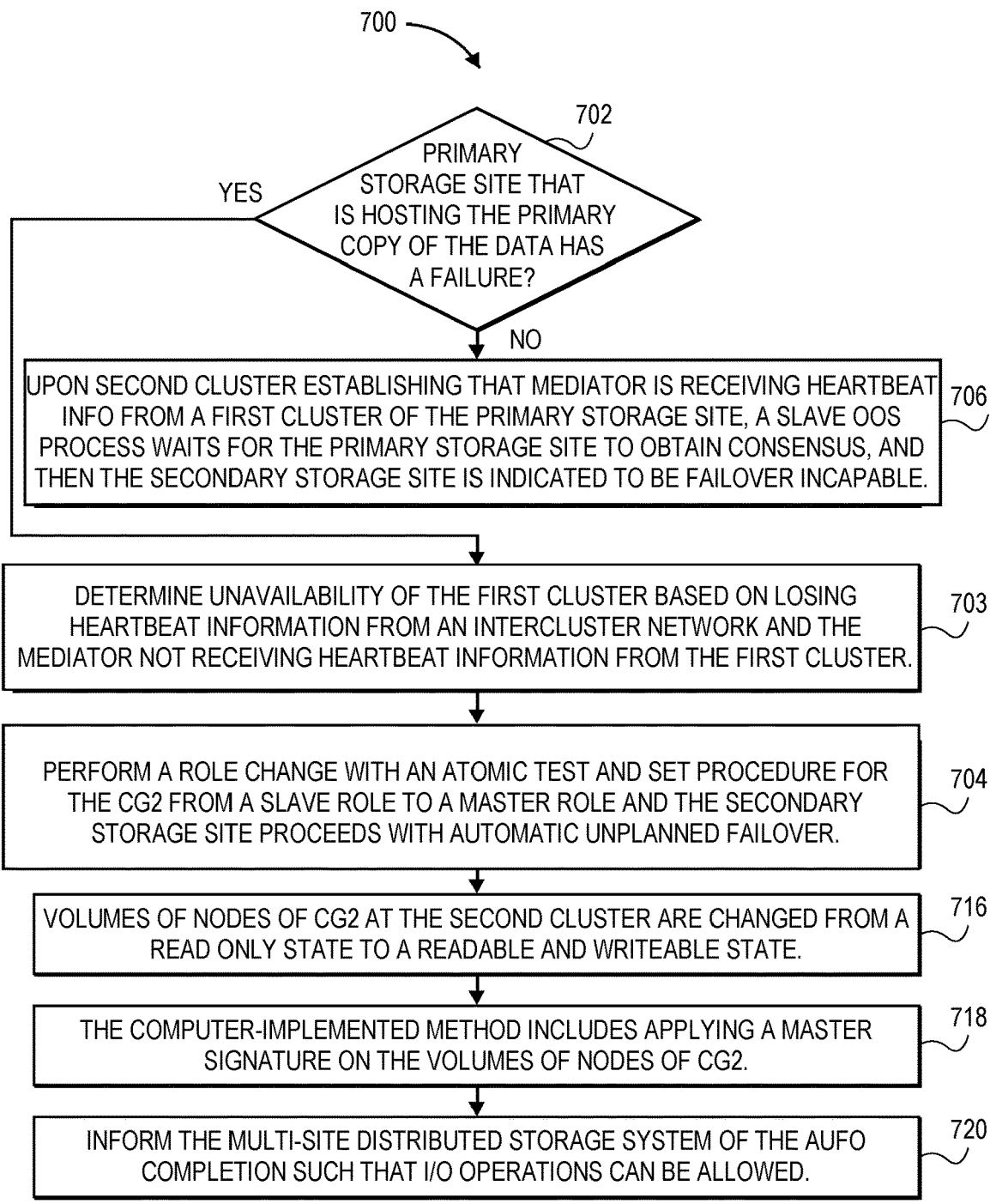
FIG. 7 is a flow diagram illustrating a computer-implemented method 700 of detailed operations for an automatic unplanned failover (AUFO) feature that provides non-disruptiveness in presence of failures in accordance with an embodiment of the present disclosure.

FIG. 7 is a flow diagram illustrating a computer-implemented method 700 of detailed operations for an automatic unplanned failover (AUFO) feature that provides non-disruptiveness in presence of failures in accordance with an embodiment of the present disclosure. As noted above, this AUFO feature of the present design provides an order of operations such that a primary copy of data at a primary storage site continues to serve I/O operations until a mirror copy of the data at a secondary storage site is ready.

Although the operations in the computer-implemented method 700 are shown in a particular order, the order of the actions can be modified. Thus, the illustrated embodiments can be performed in a different order, and some operations may be performed in parallel. Some of the operations listed in FIG. 7 are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of computer-implemented method 700 may be executed by a storage controller, a storage virtual machine (e.g., SVM 511a, SVM 511b), a mediator (e.g., mediator 120, mediator 220, mediator 360), a mediator agent (e.g., mediator agent 139a-139n, mediator agent 149a-149n, mediator agent 239a-239n, mediator agent 249a-249n, mediator agent 313, 314, 323, 324, mediator agent 439), a multi-site distributed storage system, a computer system, a machine, a server, a web appliance, a centralized system, a distributed node, or any system, which includes processing logic (e.g., one or more processors, a processing resource). The processing logic may include hardware (circuitry, dedicated logic, etc.), software (such as is run on a general purpose computer system or a dedicated machine or a device), or a combination of both.

At operation 702, the computer-implemented method includes triggering or causing a determination of whether the primary storage site that is hosting the primary copy of the data has a failure upon receiving an indication from the secondary storage site of an OOS state.

In one example, a mediator agent of the second cluster at the secondary storage site communicates with an external third party mediator to perform this determination.

At operation 703, the mediator agent of the second cluster determines unavailability of the first cluster of the primary storage site based on losing heartbeat information from an intercluster network and the mediator not receiving heartbeat information from the first cluster. At operation 704, upon establishing the unavailability of the first cluster, the mediator agent at the second cluster performs a role change with an atomic test and set procedure (atomic check and set) for the consistency group of the second cluster (CG2) from a slave role to a master role and the secondary storage site proceeds with AUFO.

Alternatively, at operation 706, the computer implemented method determines that the primary storage site has no failure (e.g., operational or responsive), and a slave OOS process at the second cluster waits for the primary storage site to obtain consensus, and then the secondary storage site is indicated to be failover incapable. The slave OOS process at the second cluster waits for the primary storage site to obtain consensus after the second cluster has established that the mediator is receiving heartbeat information from the first cluster.

At operation 716, volumes of nodes of CG2 at the second cluster are changed from a read only state to a readable and writeable state. At operation 718, the computer-implemented method includes applying a master signature on the volumes of nodes of CG2. At operation 720, the computer-implemented method includes informing the multi-site distributed storage system of the AUFO completion such that I/O operations can be allowed. Each of operations 716, 718, and 720 are idempotent to enable restartability.

The atomic test involves checking whether a relationship state between primary and mirror copies is already synchronized (e.g., a secondary mirror copy (slave) is failover capable) or not. If a relationship state is synchronized (e.g., in sync state), then the mirror copy (slave) will be failover capable. The setting to change owner of this consistency group to CG2 (master) only occurs when atomic test determines that the relationship is synchronized. A change of ownership is stored as a database update with a mediator. If the atomic test fails with relationship state not in sync state and thus an unplanned failover fails, then no change occurs in owner of the consistency group. In a normal case, the second cluster checks that the relationship is still synchronized and then in an atomic fashion changes the owner for this CG to CG2.

The multi-site distributed storage system is designed to avoid having the secondary storage site having a slave role from being aggressive and causing the primary storage site having a master role to shut down this master role prematurely. The multi-site distributed storage system is designed to have the primary storage site continue to serve I/O operations if operational. Thus, the OOS state of the secondary storage site implements a wait and retry approach when the primary storage site is detected to be operational. If the primary storage site with the master role is detected to be operational, then the method waits until the primary storage site has acquired consensus.

In one example, a primary storage site initially having a master role for the CG becomes non-operational and this triggers a slave side (secondary storage site) OOS state. However, before the mediator is triggered to generate the AUFO outcome based on the OOS state, the secondary storage site becomes non-operational as well. Upon a controller reboot, the secondary storage site attempts to trigger OOS state processing once again.

This is one such failure, there can be other failures as well between the OOS state trigger and when the AUFO outcome is recorded in the multi-site distributed storage system. The AUFO process is designed with restartability and idempotent to provide non-disruptive guarantee for serving I/O operations even when multiple failures occur as described in this example.

The AUFO process is also designed to not be complete or finished until all the steps in the AUFO are done even if failures arise. This is performed by persistently storing an indication that the mediator triggered AUFO (e.g., discovered that master is down) which enables the AUFO to restart even if double failures occur. Since the mediator has performed the role change, the first cluster that initially has a master role cannot obtain consensus so no other operation is allowed until the AUFO is complete at the second cluster.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium (or non-transitory computer-readable medium) may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 8:
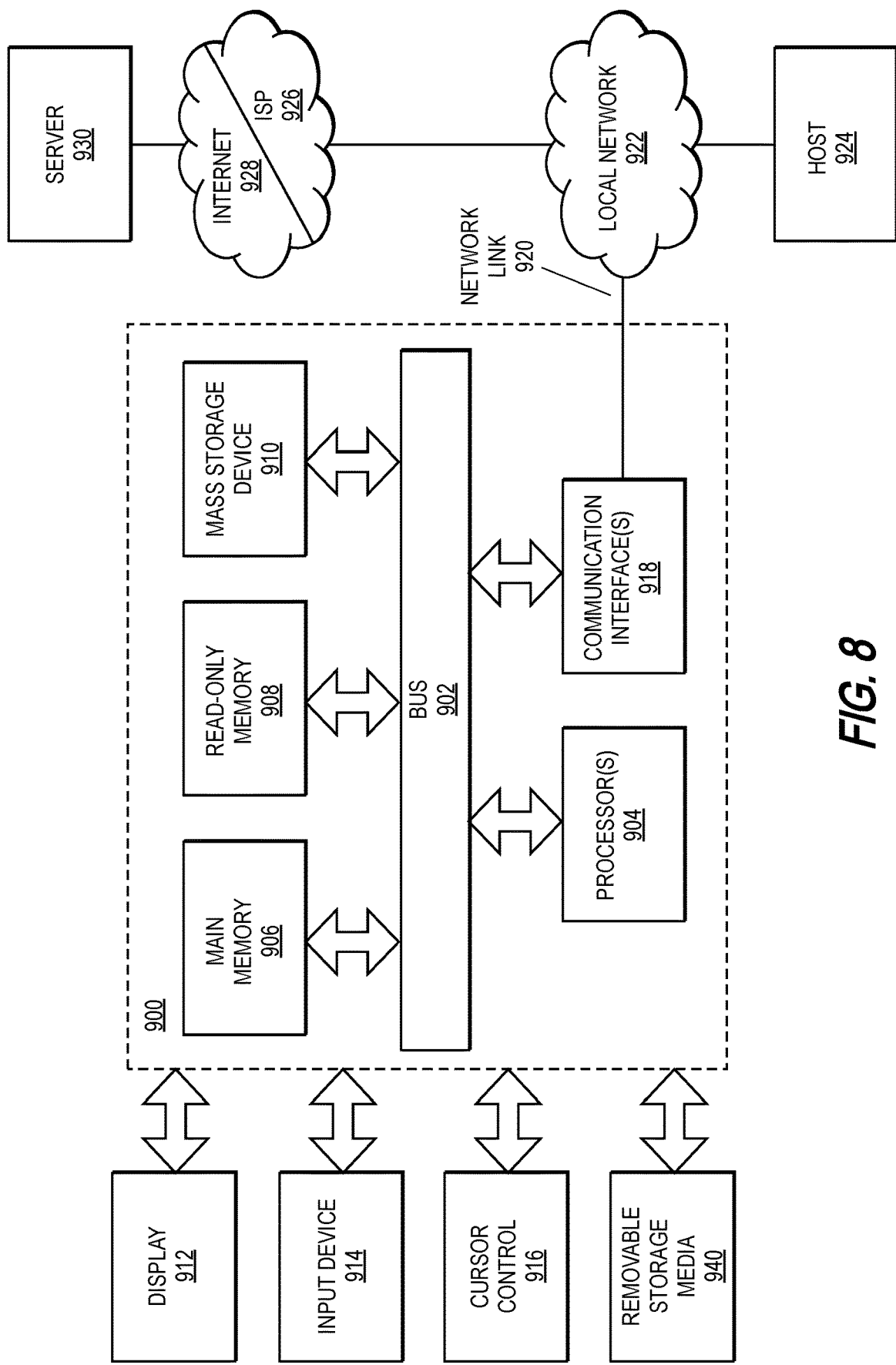
FIG. 8 illustrates an example computer system in which or with which embodiments of the present disclosure may be utilized.

FIG. 8 is a block diagram that illustrates a computer system 900 in which or with which an embodiment of the present disclosure may be implemented. Computer system 900 may be representative of all or a portion of the computing resources associated with a storage node (e.g., storage node 136a-n, storage node 146a-n, storage node 236a-n, storage node 246a-n, nodes 311-312, nodes 321-322, storage node 400), a mediator (e.g., mediator 120, mediator 220, mediator 360), or an administrative work station (e.g., computer system 110, computer system 210). Notably, components of computer system 900 described herein are meant only to exemplify various possibilities. In no way should example computer system 900 limit the scope of the present disclosure. In the context of the present example, computer system 900 includes a bus 902 or other communication mechanism for communicating information, and a processing resource (e.g., processing logic, hardware processor(s) 904) coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, e.g., a magnetic disk, optical disk or flash disk (made of flash memory chips), is provided and coupled to bus 902 for storing information and instructions.

Computer system 900 may be coupled via bus 902 to a display 912, e.g., a cathode ray tube (CRT), Liquid Crystal Display (LCD), Organic Light-Emitting Diode Display (OLED), Digital Light Processing Display (DLP) or the like, for displaying information to a computer user. An input device 914, including alphanumeric and other keys, is coupled to bus 902 for communicating information and command selections to processor 904. Another type of user input device is cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Removable storage media 940 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 900 may implement the techniques described herein using customized hard-wired logic, one or more ASICs or FPGAs, firmware or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 910. Volatile media includes dynamic memory, such as main memory 906. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, or stored in storage device 910, or other non-volatile storage for later execution.

What is claimed is:

1. A computer-implemented method for a non-disruptive automatic unplanned failover performed by one or more processors of a multi-site distributed storage system with a primary storage site having a first cluster and a secondary storage site having a second cluster, the method comprising:
   initiating an out of sync (OOS) state for a relationship between the first and second clusters when the secondary storage site fails to receive heartbeat information from the primary storage site during a time period with the heartbeat information indicating an operational condition for the primary storage site;
   initiating, with a mediator, an automatic unplanned failover based on the OOS state; storing an indication of the mediator for initiating the automatic unplanned failover; and
   completing operations of the automatic unplanned failover with restorability based on storing the indication of the mediator initiating the automatic unplanned failover, which enables the automatic unplanned failover to restart and have a successful outcome for the automatic unplanned failover even when multiple failures occur in the multi-site distributed storage system.

2. The computer-implemented method of claim 1, further comprising:
   in response to detecting the OOS state, storing the OOS state that is associated with a heartbeat information event for a volume of the consistency group of the second cluster and also to store OOS state for any other volumes of the consistency group having the OOS state and associated heartbeat information events; and
   deduplicating, with a mediator agent, heartbeat information events having duplicative OOS states.

3. The computer-implemented method of claim 1, further comprising:
   determining, with a mediator agent, whether the primary storage site has a failure, wherein the automatic unplanned failover is performed when the primary storage site is determined to have a failure and detection of the OOS state to avoid a split-brain situation between the primary and secondary storage sites.

4. The computer-implemented method of claim 1, further comprising:
   performing a role change for the consistency group of the second cluster from slave to master role based on the automatic unplanned failover;
   storing the role change as a state for the consistency group; and
   serving, with the second cluster, input/output (I/O) operations that are received from a host.

5. The computer-implemented method of claim 1, further comprising:
   waiting for the first cluster of the primary storage site to acquire a consensus when the primary storage site is determined to be capable of performing operations; and
   indicating the second cluster as failover incapable when the first cluster acquires the consensus, wherein the multi-site distributed storage system is designed to have the first cluster continue to serve input/output (I/O) operations if the first cluster is operational to avoid having the second cluster with the slave role from being aggressive and causing the first cluster having the master role to shut down the master role prematurely.

6. The computer-implemented method of claim 1, further comprising:
   monitoring, with the secondary storage site, heartbeat information received at a certain interval from the primary storage site.

7. The computer-implemented method of claim 6, further comprising:
   determining, with the secondary storage site, whether the heartbeat information is received at the certain interval during a time period.

8. The computer-implemented method of claim 1, further comprising:
   replicating, with a communication channel, the primary copy of the data of the first cluster to the secondary copy of the data in the second cluster, wherein the heartbeat information is transferred from the first cluster to the second cluster with the communication channel.

9. A multi-site distributed storage system having a primary storage site with a first cluster and a secondary storage site with a second cluster comprising:
   one or more processing resources; and
   a non-transitory computer-readable medium coupled to the one or more processing resources, having stored therein instructions, which when executed by the one or more processing resources cause the one or more processing resources to:
   monitor heartbeat information received at a certain interval from the first cluster of the multi-site distributed storage system with the heartbeat information indicating an operational condition for the primary storage site;
   initiate an out of sync (OOS) state of the second cluster for a relationship between a primary copy of data of a consistency group in the first cluster and a secondary mirror copy of the data in the second cluster when the secondary storage site fails to receive the heartbeat information during a time period;

in response to detecting the OOS state, storing the OOS state that is associated with a heartbeat information event for a volume of the consistency group of the second cluster and also to store OOS state for any other volumes of the consistency group having the OOS state and associated heartbeat information events; and deduplicating heartbeat information events having duplicative OOS states from different volumes of the consistency group.

10. The multi-site distributed storage system of claim 9, wherein the secondary storage site to wait for the first cluster to acquire a consensus when the primary storage site is determined to be available or capable of performing operations based on a determination of a mediator or an inter cluster communication between the first and second clusters and to indicate the second cluster as failover incapable when the first cluster acquires the consensus.

11. The multi-site distributed storage system of claim 9, wherein the multi-site distributed storage system is designed to have the first cluster continue to serve input/output (I/O) operations if the first cluster is operational to avoid having the second cluster with a slave role from being aggressive and causing the first cluster having a master role to shut down the master role prematurely.

12. The multi-site distributed storage system of claim 9, wherein the automatic unplanned failover is performed when the primary storage site is determined to have a failure and upon detection of an out of sync (OOS) state to avoid a split-brain situation.

13. The multi-site distributed storage system of claim 9, wherein the instructions when executed by the one or more processing resources cause the one or more processing resources to:

perform a role change for a consistency group of the second cluster from a slave role to a master role based on the automatic unplanned failover;

store the role change as a state for the consistency group;

change a volume for the consistency group of the second cluster from a read state to a read write state; and serve, with the second cluster of the secondary storage site, input/output (I/O) operations that are received from a host.

14. The multi-site distributed storage system of claim 9, wherein the automatic unplanned failover is designed to be idempotent when repeating the automatic unplanned failover multiple times.

15. The multi-site distributed storage system of claim 9, wherein the instructions when executed by the one or more processing resources cause the one or more processing resources to determine whether the first cluster is detected with a failure, wherein the automatic unplanned failover is designed to complete operations with restartability based on storing an indication of a mediator starting the automatic unplanned failover due to a failure in the first cluster, which enables the automatic unplanned failover to restart even when multiple failures occur in the multi-site distributed storage system.

16. The multi-site distributed storage system of claim 9, further comprising:

a communication channel to replicate a primary copy of data of the first cluster to a secondary copy of the data in the second cluster, wherein the heartbeat information is transferred from the first cluster to the second cluster with the communication channel.

17. A non-transitory computer-readable storage medium embodying a set of instructions, which when executed by one or more processing resources of a multi-site distributed storage system cause the one or more processing resources to:

initiate an out of sync (OOS) state for a relationship between the first and second clusters when the secondary storage site fails to receive heartbeat information from the primary storage site during a time period with the heartbeat information indicating an operational condition for the primary storage site;

initiate an automatic unplanned failover based on the OOS state; and store an indication of a mediator for initiating the automatic unplanned failover, wherein the automatic unplanned failover is designed to complete operations with restorability based on storing the indication of the mediator initiating the automatic unplanned failover, which enables the automatic unplanned failover to restart and have a successful outcome for the automatic unplanned failover even when multiple failures occur in the multi-site distributed storage system.

18. The non-transitory computer-readable storage medium of claim 17, wherein the instructions when executed by the one or more processing resources cause the one or more processing resources to:

in response to detecting the OOS state, store the OOS state that is associated with a heartbeat information event for a volume of the consistency group of the second cluster and also to store OOS state for any other volumes of the consistency group having the OOS state and associated heartbeat information events; and deduplicate heartbeat information events having duplicative OOS states.

19. The non-transitory computer-readable storage medium of claim 17, wherein the instructions when executed by the one or more processing resources cause the one or more processing resources to:

determine whether the primary storage site has a failure, wherein the automatic unplanned failover is performed when the primary storage site is determined to have a failure and detection of the OOS state to avoid a split-brain situation between the primary and secondary storage sites.

20. The non-transitory computer-readable storage medium of claim 17, wherein the instructions when executed by the one or more processing resources cause the one or more processing resources to:

perform a role change for the consistency group of the second cluster from slave to master role based on the automatic unplanned failover;

store the role change as a state for the consistency group; and serve, with the second cluster, input/output (I/O) operations that are received from a host.

* * * * *